Figure 1:
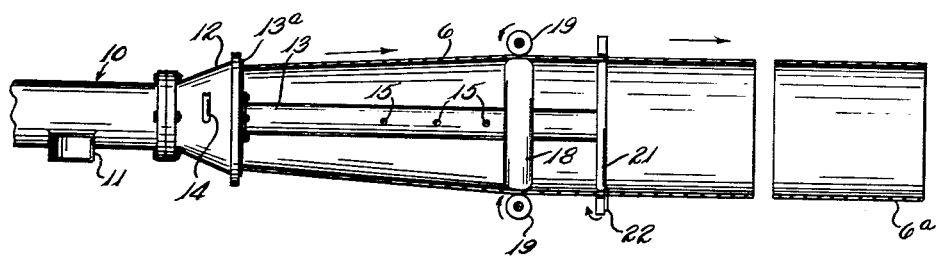
Figures 2, 3:
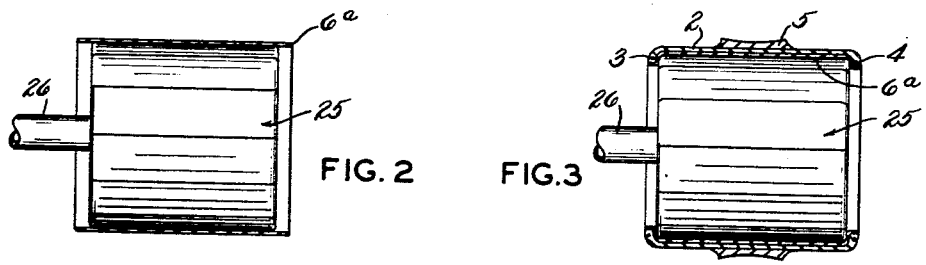
Figure 4:
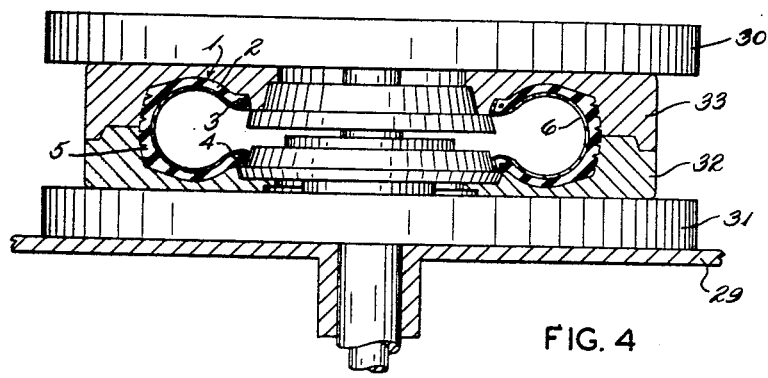
Figure 5:
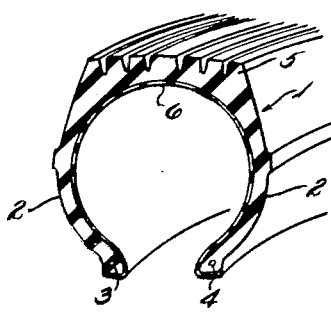

Aug. 4, 1964  G. P. BOSOMWORTH ETAL  3,143,449
TUBED INNERLINER FOR BAGLESS CURED TIRES
Filed Nov. 20, 1958

INVENTORS
GEORGE P. BOSOMWORTH
ARTHUR M. LANCASTER
BY
W. A. Fraser
ATTY.

United States Patent Office 3,143,449
Patented Aug. 4, 1964

3,143,449
TUBED INNERLINER FOR BAGLESS
CURED TIRES
George P. Bosomworth and Arthur M. Lancaster, Akron, Ohio, assignors to The Firestone Tire & Rubber Company, Akron, Ohio, a corporation of Ohio
Filed Nov. 20, 1958, Ser. No. 775,276
1 Claim. (Cl. 156—126)

This invention relates to pneumatic tires, and more particularly to an improved tubeless pneumatic tire and a method for shaping and vulcanizing such tire without the use of bags or bladders.

Unvulcanized pneumatic tires in the form of cylindrical bands, terminating at each edge in annular beads, are conventionally shaped into toroidal configuration and vulcanized by means of automatic presses similar to the one described in United States Patent 2,495,664, issued to Soderquist on January 24, 1950. Such a press includes an inflatable bladder which when inflated shapes the tire band against the inner surface of the mold, and further serves as a container for fluids used during the subsequent vulcanization of the tire. A disadvantage of such an arrangement is that the bladder is expensive and its operating life is short.

A suggestion has been made to shape and vulcanize tubeless pneumatic tires in such automatic presses without the use of bladders. One reason this suggestion has not been adopted up to the present time has been that a tubeless tire having a conventional inner liner comprised of a strip of rubber cut to length, and spliced to form a band on the inside of the tire is susceptible to leakage of fluid during vulcanization through the splice into the tire. Entry of fluid into the tire body during vulcanization causes blisters and separations and is undesirable for other reasons.

The present invention avoids the disadvantages of former bladderless curing methods by providing a splice-free inner liner for completely sealing the inside of a tubeless tire against the escape of fluid into the tire body during the vulcanizing operation.

It is, therefore, an object of the present invention to provide means for vulcanizing a tubeless tire without the use of an internal bladder or bag.

A more specific object of the invention is to provide an improved method of manufacturing a tubeless tire through use of vulcanizing equipment, without the use of an internal forming bladder.

Yet another object of the invention is to provide a tubeless tire having an endless splice-free inner liner presenting no possibility of escape of fluid into the tire body.

These and other objects of the invention will be more readily understood by reference to the specification claims and drawings, of which FIG. I is a schematic plan view of apparatus for preparing the inner liner of the invention.

FIG. II is a side elevation view partially broken away in section, showing a tire building machine during one step of the method of the invention.

FIG. III is a view similar to FIG. II, but in a more advanced stage of the method of the invention.

FIG. IV is a fragmentary side elevation view, broken away partially in section, showing a tubeless tire of the invention during the vulcanizing operation.

FIG. V is a fragmentary perspective view in section of a tubeless tire of the invention.

Referring to the figures of the drawings, and particularly to FIG. V, a tire generally indicated at 1 is comprised of a rubberized fabric body portion 2, terminating at its edges in two inextensible beads 3 and 4, and capped with a rubbery abrasion-resistant tread portion 5. The tire shown is a tubeless tire made impervious to the passage of inflation air by a substantially air impervious inner liner 6.

In preparation of the inner liner 6 (FIG. I), rubbery, warm inner liner stock is fed into an extruder generally indicated at 10, through feed orifice 11 and extruded through head 12 around mandrel 13. A die 13a shapes the wall 6 of the rubbery tube as the stock is expressed therethrough. Mandrel 13 is bolted to the face of die 13a, which is in turn mounted in the extruder 10 in a conventional manner. An air inlet hose 14 admits air under pressure into mandrel 13, which is hollow, and the air escapes through air vents 15 to inflate the rubber tube from the diameter of extrusion to the diameter finally used in building the tire.

As a continuous tube is extruded, it passes over an annular inner support 18 against which bear driven rollers 19 to frictionally engage tube 6 and move it along its path away from the extruder 10. The tube then moves over annular inner support 21, where it is periodically severed by knife 22, to give the unvulcanized barrel-shaped inner liner 6 (FIG. I).

Referring to FIG. II, the band 6 is centered coaxially on a tire building drum 25, adapted for rotation by drive shaft 26, turned by means not shown. The member 6 may be spun onto the drum in the conventional manner or may be worked onto the collapsed drum with a stretching and pulling hand operation obvious to one skilled in the art. After the member 6 is centered on drum 25, rubberized fabric plies are superimposed upon and stitched to the tacky surface of the member 6; beads 3 and 4 are applied to the ends of the drum, and the edges of the plies of the inner liner and of the fabric are turned up around those beads in the conventional manner. Tread 5 is then superimposed upon and stitched to the outer portion of the rubberized fabric body 2, and the tire band is removed from the drum 25 in preparation for the vulcanizing step.

The splice-free inner liner may be formed by extruding a continuous tube of rubbery material and cutting said tube into sections of desired length with a hand knife or scissors.

The tire band removed from the drum is then placed in a tire vulcanizing mold, such as shown in U.S. Patents 2,812,544 and 2,812,545 to Soderquist, or may be cured in a mold as described in U.S. Patent 2,354,446 issued to Brown on July 25, 1944. The mold is closed and fluid under pressure is introduced into the tire to force it out against the mold wall as the two mold halves 32 and 33 are brought together. Heat is simultaneously applied inside the tire to soften and shape the rubber to the configuration of the mold and heat may be applied to mold halves 32 and 33 to aid in this treatment. Because no splice is present in the tire inner liner, there is no chance for fluid to escape through a splice into the body of the tire and cause separation blisters which destroy the usefulness of the tire.

In practicing the invention, a rubbery composition of the following formula was mixed in a Banbury internal mixer:

Butyl rubber _____ 100
Carbon black _____ 50
Zinc oxide _____ 5.20
Stearic acid _____ 1.00
Softener _____ 1.00
Sulfur _____ 2.00
Accelerator _____ 1.60

The butyl rubber, carbon black, zinc oxide and softener were mixed together in a preliminary master batch mix and the master batch mix after aging was remixed in the Banbury mixer with the stearic acid, sulfur and accelerators, to give the vulcanizable rubbery composition. This composition was softened on a two roll mill in the conventional manner and passed through the extruder (FIG. I) and formed into a rubbery band, such as 6 in FIG. I. The band was applied to a tire building drum and rubberized fabric plies and beads were applied to the drum and the final tire band was capped with tread 5. The unvulcanized tire was placed in the tire forming and vulcanizing press and shaped into the toroidal form by closing the press and introducing fluid under pressure at a temperature of approximately 350° F. into the tire. Simultaneously, steam was passed through the platens 30 and 31 to heat the outside of the tire and the tire was left in the press for about 21 minutes. The tire was in good condition when removed from the press and was, upon cooling, ready to run on a car.

Although the formation of the member 6 has been shown by way of extrusion it will be understood by those versed in the art that such a member may be formed by other methods, the requirements of the invention being that a seamless, spliceless liner is used.

While certain examples have been shown by way of illustration, those skilled in the art will know that the invention resides within the scope of the following claim.

What is claimed is:

In a method of manufacturing a pneumatic tubeless tire wherein a band having continuous beads at each end and a plurality of plies of stretch resistant elements connecting said beads is formed and said band is expanded to generally toroidal shape and cured in a mold in said toroidal shape, steps comprising forming a splice-free cylindrical sleeve of vulcanizable rubbery material, adhering said cylindrical sleeve in unvulcanized state to the inner ply of an unvulcanized but vulcanizable rubberized tire band to cover completely the radial inner surface thereof from bead to bead, thereafter applying fluid under pressure directly against the radial inner surface of said sleeve while collapsing the edges of said tire band axially toward each other to form the toroidal shape and subjecting the shaped vulcanizable tire to heat to vulcanize the same.

References Cited in the file of this patent

UNITED STATES PATENTS

| | | |
|---|---|---|
| 1,242,073 | Tew | Oct. 2, 1917 |
| 1,289,771 | Hopkinson | Dec. 31, 1918 |
| 1,349,721 | Hopkinson | Aug. 17, 1920 |
| 1,389,442 | De Mattia | Aug. 30, 1921 |
| 1,687,302 | Midgley | Oct. 9, 1928 |
| 2,517,889 | Kuffler | Aug. 8, 1950 |
| 2,614,056 | Kraft | Oct. 14, 1952 |
| 2,698,042 | Perkins | Dec. 28, 1954 |
| 2,839,118 | Gramelspacher | June 17, 1958 |